May 30, 1950 C. R. HART 2,509,229

SWINGING TURNTABLE FOR AUTOMATIC PHONOGRAPHS

Filed July 9, 1948 2 Sheets-Sheet 1

INVENTOR
Carl R. Hart
John F. Eakins
ATTORNEY

May 30, 1950 C. R. HART 2,509,229

SWINGING TURNTABLE FOR AUTOMATIC PHONOGRAPHS

Filed July 9, 1948 2 Sheets-Sheet 2

INVENTOR
Carl R. Hart
John F. Eakins
ATTORNEY

UNITED STATES PATENT OFFICE 2,509,229

SWINGING TURNTABLE FOR AUTOMATIC PHONOGRAPHS

Carl R. Hart, Payne, Ohio, assignor to J. P. Seeburg Corporation, Chicago, Ill., a corporation of Illinois Application July 9, 1948, Serial No. 37,862

13 Claims. (Cl. 274—9)

This invention relates to a phonograph intended to play both sides of a series of records and has for its principal object to provide a small compact phonograph of this type which is simple to manufacture and simple in operation.

The present invention relates to the type of phonograph described and claimed in Patents Nos. 2,506,925 and 2,506,926 issued May 9, 1950, on applications of Carl G. Johnson. This phonograph comprises a mechanism in which records are dropped seriatim in conventional manner. The dropped record is received on a small turntable which is carried by a pivoted arm. The turntable is sufficiently small so that the recording grooves on the underside of the record are exposed so that the underside of the record can be played, the turntable being rotated in suitable direction, which is a counterclockwise direction as viewed from above. The upper side of the record can be played on the small turntable or the record can be dropped from the small turntable onto a lower turntable and from the upper side of the record may be played, the record being rotated in the opposite or clockwise direction as viewed from above. The small turntable is provided with an arcuate slot so that it may move into and out of coaxial relation with the spindle. After the record has been played on the small turntable, the arm which carries the small turntable swings outwardly allowing the record to drop on the spindle. Means are provided to position the small turntable in a definite position on its arm so as to locate the slot for proper outward movement away from the spindle. One of the objects of the present invention is to provide improved means to obtain this result. Further, when the small turntable is moved out, it must be held in this definite position so that the spindle passes freely through the slot when the arm is returned to its normal position. A further object of this invention is to provide such a means.

Other objects, advantages and capabilities of my invention will appear from the following description of a preferred embodiment thereof, taken in conjunction with the accompanying drawings in which.

Figure 1:
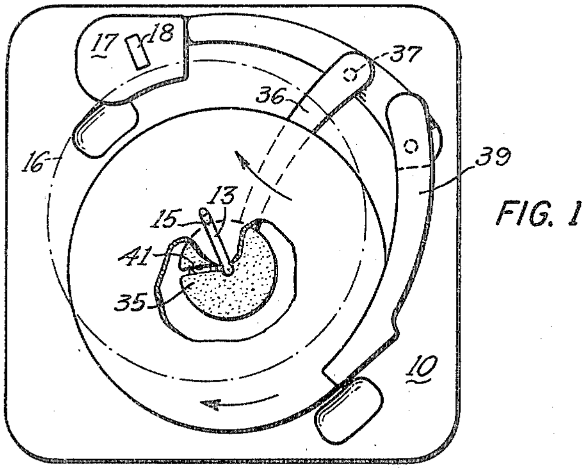
Figure 1 is a plan view of a phonograph embodying my invention.
Figure 2:
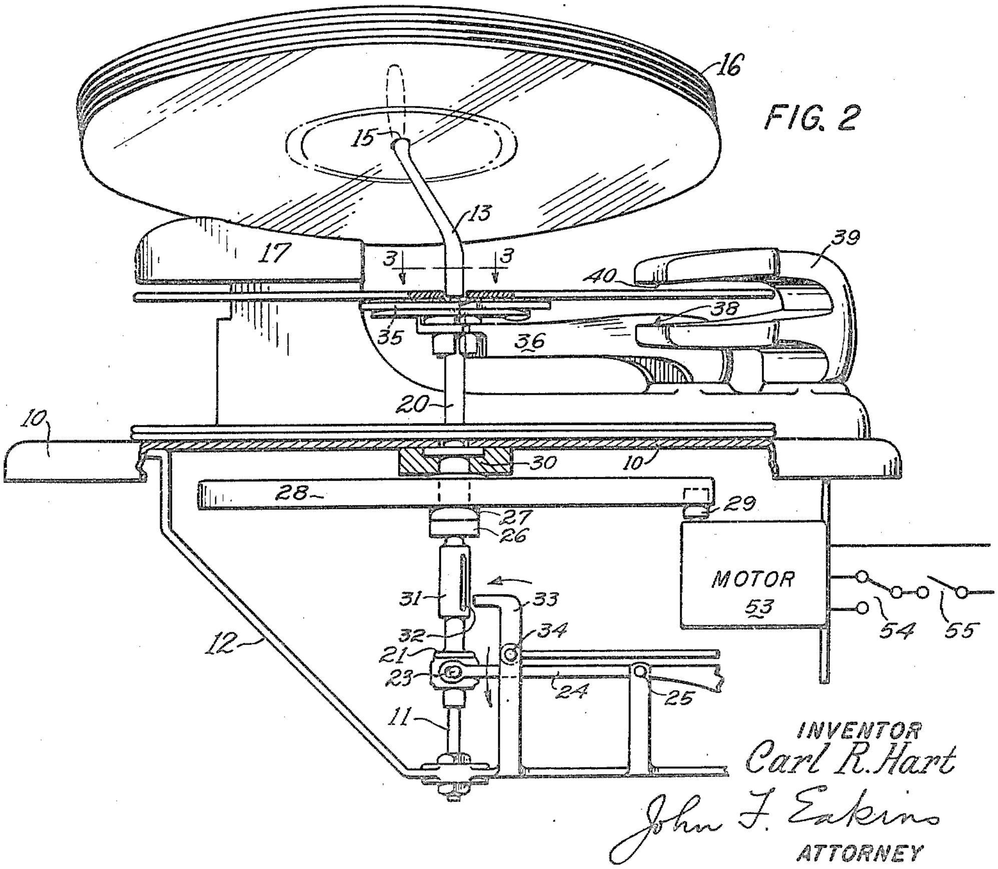
Fig. 2 is a fragmentary sectional elevation on a larger scale.
Figure 6:
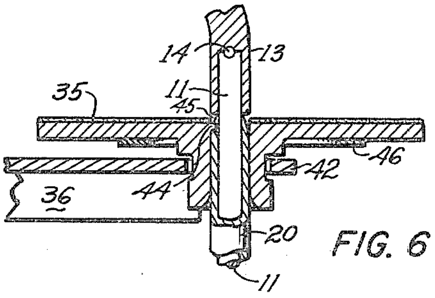
Fig. 6 is a sectional elevation through the small turntable and the element which drives it.

Referring to the drawings and particularly to Figs. 1 and 2, the phonograph comprises a base 10, on which all the mechanism is supported. A post 11 is rigidly carried by the frame 12 supported on the base 10 and projects upwardly through the base. An extension 13 is mounted on the upper end of the spindle 11 and is held against rotation by a pin 14 which seats in a recess at the upper end of the post 11, as best shown in Fig. 6. The extension 13 is provided with a record supporting step 15 for the support of a stack of records 16 which is also supported by a lateral support 17 in well-known manner. A pusher element 18 on the support 17 is actuated during each alternate record changing cycle so that the lowermost record is displaced off the support 17 so that this record drops down along the spindle onto the small turntable 35 which is then located in coaxial relation to the spindle, as shown in Fig. 1.

The post 11 extends through sleeve 20 which is vertically displaceable on the post 11. The sleeve 20 is provided with an enlarged base 21 which rests upon a block 22 also slidably mounted on the post 11. The block 22 carries opposite pins 23 which are received in openings in the forked ends of a lever 24 which is pivoted at 25. When the lever 24 is swung in the clockwise direction as viewed in Figs. 2 and 5, the sleeve 20 is moved upwardly, and when the lever 24 is swung in the opposite direction, the sleeve 20 is moved downwardly.

At an intermediate position, the sleeve 20 carries a friction clutch element 26 which is arranged to engage a corresponding clutch element 27. When the sleeve 20 is moved downwardly by the lever 24, these clutch elements are disengaged. The clutch element 27 is provided on the hub of a drive wheel 28. The drive wheel 28 is provided with a peripheral flange which is engaged by a driving pinion 29 so that the drive wheel 28 may be driven at turntable speed in either direction. The drive wheel 28 is rotatably supported on a bearing 30 carried by the base 10 and the sleeve 20 extends through its hub in free sliding fashion.

Figure 5:
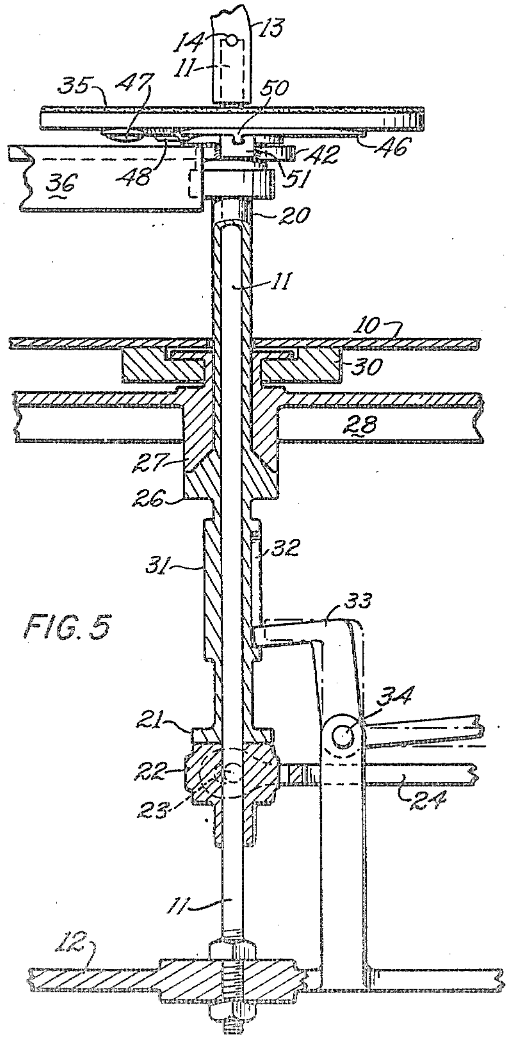
Fig. 5 is a sectional elevation showing elements associated with the spindle and small turntable.

Below the clutch element 26, the sleeve 20 is provided with an enlarged portion 31 which is provided with an elongated vertical slot 32. A latch 33, pivotally mounted at 34 is arranged to enter the lowermost end of the slot 32 as shown in Fig. 5. When the sleeve 20 is being driven and the latch 33 is actuated, it enters the lowermost end of the slot 32 and arrests the sleeve 20 in a definite position. When this occurs, the clutch elements 26 and 27 slip relatively, the drive of the wheel 28 continuing to complete the record changing cycle. The lever 24 is actuated so as to move the sleeve 20 downwardly, disengaging the clutch elements 26 and 27.

Figure 3:
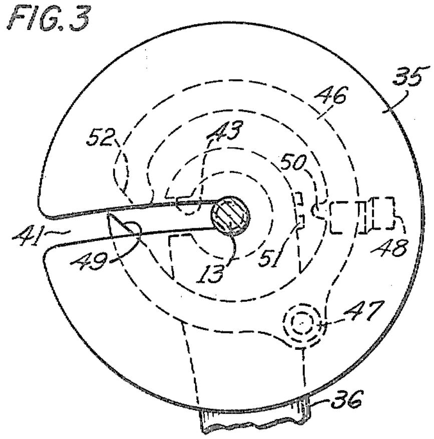
Fig. 3 is a fragmentary plan view on a still larger scale showing the small turntable in playing relation to the spindle.
Figure 4:
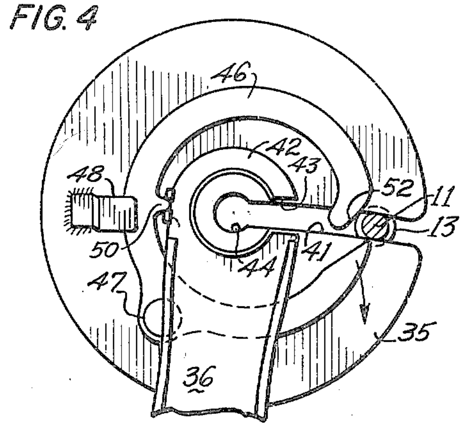
Fig. 4 is an inverted plan view of the small turntable as it is being moved away from the spindle.
Figure 7:
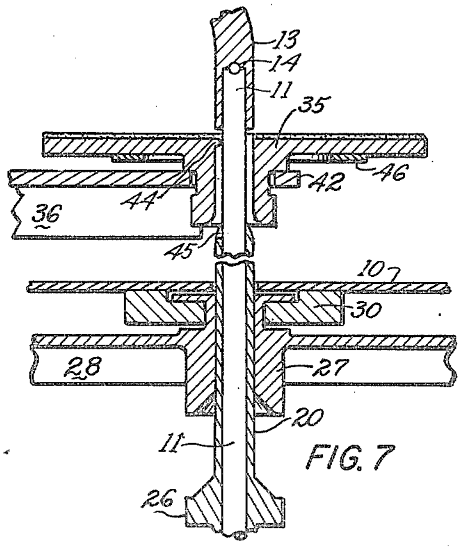
Fig. 7 is a similar view showing the small turntable with its drive disconnected.

The small turntable 35 is freely carried by an arm 36 which is pivotally mounted at 37 for horizontal movement. The diameter of the small turntable is sufficiently small so that the recording grooves on a record supported on the small turntable are exposed for playing by an upwardly directed stylus 38 carried by a player arm structure 39. The player arm structure also provides a downwardly directed stylus 40 for playing the upper side of a record supported on the small turntable 35, as shown in Fig. 2. In the embodiment illustrated, the player arm structure 39 comprises two arms which are located, one on each side of the position of a record being played. To play the topside of a record, the drive wheel 28 is driven in the appropriate direction and the player arm structure 39 is rocked so as to bring the stylus 40 into engagement with the topside of the record. When the underside of a record is being played, the drive wheel 28 is driven in the opposite direction and player arm structure 39 is rocked so as to bring the stylus 38 into engagement with the underside of the record. The small turntable 35 is mounted on the arm 36 at a distance from the vertical pivot 37 by a distance so that the small turntable can be brought into coaxial relation with the post 11, by swinging movement of the arm 36. The small turntable 35 is provided with a slot 41 which extends from the periphery of the small turntable inwardly through its hub into its central opening. The ring-like supporting element 42 on the arm 36 is also provided with a slot 43 which can be brought into alignment with the slot 41 to provide for the passage of the spindle elements as the small turntable is moved inwardly and outwardly. The position of the spindle elements and the slots 41 and 43 during inward or outward movement of the small turntable, is shown in Fig. 4. The upper end of the sleeve 20 is arranged to slide into and out of the central opening of the turntable hub, as shown in Figs. 6 and 7. A projection 44 near the upper end of the bore of the small turntable 35 is arranged to seat in a corresponding recess 45 at the upper end of the sleeve 20. When the small turntable is moved into coaxial relation with the spindle elements as shown in Fig. 7, and the sleeve 20 is moved upwardly as shown in Fig. 6, the sleeve 20 is brought into rotation so that the projection 44 drops into the recess 45, thus establishing driving relation for the small turntable 35. When the small turntable is being driven, it is completely clear of the arm 36 as shown in Fig. 6. It is to be noted that in the driving position as shown in Fig. 6, the upper surface of the turntable 35 is located slightly below the lower end of the extension 13 so that a record on the turntable is centered by engagement of its central hole with the lower end of the extension 13. It is to be noted that the engagement of the projection 44 with the recess 45, establishes a definite relation between the angular position of the turntable and the angular position of the sleeve 20. Consequently, when the latch 33 is released and enters the slot 32, the turntable 35 is arrested in a definite angular position. This definite angular position is shown in Fig. 4, and in that position the slots 41 and 43 are in alignment and the slot 41 is located in concentric relation to the vertical pivot 37. Consequently, the turntable 35 is conditioned for free outward swinging movement of the arm 36 to remove the turntable away from the spindle elements. This definite relation between the small turntable and the arm 36 should be maintained while the arm 36 is in its outward position so that the slot 41 is properly positioned to receive and permit passage of the spindle elements as the arm 36 is swung inwardly. To attain this result, I provide a lock between the arm 36 and the turntable 35. This lock comprises an arcuate lever 46 which is pivotally mounted on the underside of the turntable 35 at 47. One or more supports 48 mounted on the underside of the turntable holds the lever 46 close to the underside of the turntable. The free ends of the lever 47 are located adjacent the slot 41 and they are spaced in the radial direction as best seen in Figs. 3 and 4. When the turntable 35 is in playing position, as shown in Fig. 3, the outer end of the lever 46 is located across the slot 41. As the arm 36 is swung outwardly, the post 11 engages an inwardly directed cam surface 49 on the outer end of the lever and this lever is consequently swung in a counterclockwise direction as viewed from above, moving the outer end of the lever out of the slot 41 and bringing the inner end of the lever across the slot. The lever 46 carries a detent 50 which registers with a corresponding opening in a flange 51 carried by the ring-like portion 42 of the arm 36 when the turntable 35 is in the definite position relative to the arm 36, discussed above. As the arm 36 swings outwardly, the counterclockwise movement of the lever 46 brings the detent 50 into the opening in the flange 51, latching the turntable in said definite position relative to the arm 36. As the arm 36 is again moved inwardly, the post 11 is moved relatively through slot 41 and engages the outwardly directed cam surface 52 on the inner end of the lever 46 so that this lever is swung in the clockwise direction as viewed from above or in the counterclockwise direction as viewed in Fig. 4, which is an inverted plan, and the detent 50 is moved out of the opening in the flange 51, the inner end of the lever 46 being moved out of the slot 41 and the outer end of the lever 46 being brought across the slot 41.

The driving pinion 29 may be driven in either direction by a reversible motor 53 controlled by a reversing switch 54 and an on and off switch 55.

The operation is as follows: A stack of records is mounted on the lateral support 17 and on the step 15 with the upper end of the extension 13 extending through the center holes of the records of the stack in well-known manner. The switch 55 is closed and the switch 54 is positioned to drive the turntable in the clockwise direction as viewed from above. The arm 36 is swung inwardly into coaxial relation with the post 11. When the arm 36 is out, the turntable is locked in its definite position on the arm 36 by the lever 46. As the arm 36 moves inwardly, the post 11 engages the cam surface 52 and swings the lever 46 into unlocking position. The inner end of the lever 46 is displaced from the slot 41 and the outer end of the lever 46 is moved into the slot 41 as shown in Fig. 3. The latch 33 is moved to unlatched position. The lever 24 is actuated to displace the sleeve 20 upwardly, bringing the clutch elements 26 and 27 into engagement so that the sprindle 20 is driven in the clockwise direction as viewed from above. The elevation of the sleeve 20 and its rotation brings the projection 44 into the recess 45 so that turntable 35 is driven in the clockwise direction as viewed from above. The turntable 35 is elecated slightly so that it is completely clear of the arm 36 as best seen in Fig. 6. The pusher element 38 is now actuated so that the lowermost record drops down the spindle extension 13 and seats on the small turntable 35. The player arm structure 39 is moved inwardly and downwardly so as to engage the upper surface of the record at initial playing position. The upper side of the record is thus reproduced. At the end of the playing of the upper side of the record, the player arm structure 39 is swung upwardly slightly and is swung outwardly to initial playing position and it is then swung upwardly so that the stylus 39 engages the underside of the record at initial playing position. The switch 54 is moved to reversing position so that the drive of the drive element 29 is reversed and the turntable is rotated in counterclockwise direction as viewed from above. The underside of the record is thus reproduced. After the underside of the record is reproduced, the player arm is moved outwardly clear of the record and the latch 33 is released, arresting the sleeve 20 and the turntable 35 in its definite position relative to the arm 36. The arm 24 is actuated so that the sleeve 20 descends, disengaging the clutch elements 26 and 27 and clearing the lower end of the boss of the turntable 35 as shown in Fig. 7. The arm 36 is then swung outwardly, as it is free to do, owing to the location of the slot 41 in its definite position. The played record is retained on the spindle elements and after the small turntable is moved out clear of the record, the played record drops down the spindle elements onto the base 10. The upper end of the sleeve 20 is chamfered so that the record is properly guided downwardly over the sleeve 20. As the arm 36 moves outwardly, the post 11 engages the cam surface 49 and swings the lever 46 into turntable locking position. The outer end of the lever 46 is displaced from the slot 41 and the inner end of the lever 46 is moved into position across the slot. Consequently, the turntable is locked on the arm 36 in its definite position for return into coaxial relation to the spindle elements. The operation is repeated indefinitely to play both sides of each record of the stack.

Although the invention has been described in connection with the specific details of a preferred embodiment thereof, it must be understood that such details are not intended to be limitative of the invention, except insofar as set forth in the accompanying claims.

Having thus described my invention, I declare that what I claim is:

1. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, said spindle structure including a driven element, complementary separate engaging formations on said driven element and turntable whereby the turntable is driven, and a latch for arresting said driven element in a definite position thereby locating said turntable in a definite position relative to said supporting means, in which its slot is positioned for the passage of the spindle structure when the supporting means is moved in its path.

2. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, said spindle structure including a driven sleeve, complementary separable engaging formations on said sleeve and turntable whereby the turntable is driven, and a latch for arresting said sleeve in a definite position thereby locating said turntable in a definite position relative to said supporting means, in which its slot is positioned for the passage of the spindle structure when the supporting means is moved in its path.

3. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, said spindle structure including a driven sleeve, complementary separable engaging formations on said sleeve and turntable whereby the turntable is driven, means for relatively moving said sleeve and turntable in their axial direction to engage and disengage said formations, and a latch for arresting said sleeve in a definite position thereby locating said turntable in a definite position relative to said supporting means, in which its slot is positioned for the passage of the spindle structure when the supporting means is moved in its path.

4. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, said spindle structure including a driven sleeve, complementary separable engaging formations on said sleeve and turntable whereby the turntable is driven, means for moving said sleeve upwardly and downwardly in its axial direction to engage and disengage said formations, and a latch for arresting said sleeve in a definite position thereby locating said turntable in a definite position relative to said supporting means, in which its slot is positioned for the passage of the spindle structure when the supporting means is moved in its path.

5. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, a latch arranged to hold said turntable in a definite position on said supporting means in which the path of the slot registers with the spindle structure, and a movable element operatively connected to said latch and located in said slot when the turntable is adjacent the spindle, said element being arranged to engage and to be actuated by the spindle structure as the turntable is moved outwardly to lock said latch.

6. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, a latch arranged to hold said turntable in a definite position on said supporting means in which the path of the slot registers with the spindle structure, and a movable element operatively connected to said latch and located in said slot when the turntable is away from the spindle, said element being arranged to engage and to be actuated by the spindle structure as the turntable is moved inwardly to unlock said latch.

7. In a phonograph, in combination, a record receiving spindle structure, supporting means mounted adjacent said spindle structure for movement in a path, a record supporting turntable carried by said supporting means, said turntable being provided with a slot extending substantially to its center, said slot embracing said spindle structure when said supporting means is moved in said path, and a latch arranged to hold said turntable in a definite position on said supporting means in which the path of the slot registers with the spindle structure, said latch being arranged to be actuated by the spindle structure as the turntable is moved outwardly to lock said latch and to be actuated by the spindle structure as the turntable is moved inwardly to unlock said latch.

8. In a phonograph, in combination, a record receiving spindle structure, supporting means mounted adjacent said spindle for movement in a path, a small turntable carried by said supporting means and arranged to be brought into coaxial relation with said spindle structure and into a position laterally outwardly with respect to said spindle structure by movements of the supporting member in its path, said small turntable being provided with a slot which in one position of the turntable relative to the supporting means permits said movements, being in that position located for the passage of the spindle structure therethrough, complementary latch elements on said turntable and said supporting means for latching said turntable in said position, and a pair of members operatively associated with one of said latch elements and movable into and out of said slot alternately, one of said pair of members being arranged to be engaged by said spindle structure as the turntable moves outwardly to move the associated latch element to latching position and the other of said pair of members being arranged to be engaged by said spindle structure as the turntable moves inwardly to move said associated latch element to unlatched position.

9. In a phonograph, in combination, a record receiving spindle structure, supporting means mounted adjacent said spindle for movement in a path, a small turntable carried by said supporting means and arranged to be brought into coaxial relation with said spindle structure and into a position laterally outwardly with respect to said spindle structure by movements of the supporting member in its path, said small turntable being provided with a slot which in one position of the turntable relative to the supporting means permits said movements, being in that position located for the passage of the spindle structure therethrough, complementary latch elements on said turntable and said supporting means for latching said turntable in said position, and a generally C-shaped pivoted member carrying one of said latch elements and comprising radially spaced cam-shaped ends movable alternately across said slot when the turntable is in said position, one of said ends being arranged to be engaged by the spindle structure as the turntable is moved inwardly to unlatch the turntable and the other end being arranged to be engaged by the spindle structure as the turntable is moved outwardly to latch said turntable.

10. In a phonograph, in combination, a record receiving spindle structure, supporting means mounted adjacent said spindle for movement in a path, a small turntable carried by said supporting means and arranged to be brought into coaxial relation with said spindle structure and into a position laterally outwardly with respect to said spindle structure by movements of the supporting member in its path, said small turntable being provided with a slot which in one position of the turntable relative to the supporting means permits said movements being in that position located for the passage of the spindle structure therethrough, complementary latch elements on said turntable and said supporting means for latching said turntable in said position, and a generally C-shaped member pivotally mounted on the underside of said turntable carrying one of said latch elements and comprising cam-shaped ends movable alternately across said slot when the turntable is in said position, said ends being displaced in the radial direction, the inner end being arranged to be engaged by the spindle structure as the turntable is moved inwardly swinging the C-shaped member into unlatching position and moving the outer end into position across the slot, and the outer end being arranged to be engaged by the spindle structure as the turntable is moved outwardly swinging the C-shaped structure into latching position and locating the inner end across the slot.

11. In a phonograph, in combination, a record receiving spindle structure including a driven sleeve, supporting means mounted adjacent said spindle structure for movement in a path, a record supporting turntable carried by said supporting means, said turntable being provided with a central opening and a slot extending from its periphery into said central opening, separable complementary engaging elements on said turntable and sleeve to effect the drive of said turntable by the sleeve and maintain the turntable in a definite position relative to said sleeve, an element for arresting said sleeve in a definite position to locate said turntable in a definite position to locate the slot in position to accommodate the spindle structure as the supporting means is moved in its path to carry the turntable away from the spindle structure, a latch for latching said turntable to said supporting member, and a member engaged by said spindle structure as the supporting member moves outwardly for moving said latch to latching position.

12. In a phonograph, in combination, a record receiving spindle structure including a driven sleeve, supporting means mounted adjacent said spindle structure for movement in a path, a record supporting turntable carried by said supporting means, said turntable being provided with a central opening and a slot extending from its periphery into said central opening, separable complementary engaging elements on said turntable and sleeve to effect the drive of said turntable by the sleeve and maintain the turntable in a definite position relative to said sleeve, an element for arresting said sleeve in a definite position to locate said turntable in a definite position to locate the slot in position to accommodate the spindle structure as the supporting means is moved in its path to carry the turntable away from the spindle structure, a latch for latching said turntable to said supporting member, and a member engaged by said spindle structure as the supporting member moves inwardly for moving said latch to unlatching position.

13. In a phonograph, in combination, a record receiving spindle structure including a driven sleeve, supporting means mounted adjacent said spindle structure for movement in a path, a record supporting turntable carried by said supporting means, said turntable being provided with a central opening and a slot extending from its periphery into said central opening, separable complementary engaging elements on said turntable and sleeve to effect the drive of said turntable by the sleeve and maintain the turntable in a definite position relative to said sleeve, an element for arresting said sleeve in a definite position to locate said turntable in a definite position to locate the slot in position to accommodate the spindle structure as the supporting means is moved in its path to carry the turntable away from the spindle structure, a latch for latching said turntable to said supporting member, a member engaged by said spindle structure as the supporting member moves inwardly for moving said latch to unlatching position, and a member engaged by said spindle structure as the supporting member moves outwardly for moving said latch to latching position.

CARL R. HART.

No references cited.